(12) United States Patent
Lin

(10) Patent No.: US 8,454,257 B2
(45) Date of Patent: Jun. 4, 2013

(54) HAND-WRITING INPUT DEVICE AND HAND-WRITING INPUT SYSTEM

(75) Inventor: Tsung-Yu Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 722 days.

(21) Appl. No.: 12/612,053

(22) Filed: Nov. 4, 2009

(65) Prior Publication Data

US 2010/0260533 A1 Oct. 14, 2010

(30) Foreign Application Priority Data

Apr. 13, 2009 (CN) .......................... 2009 1 0301500

(51) Int. Cl.
*B43K 29/00* (2006.01)
*G06F 3/033* (2006.01)

(52) U.S. Cl.
USPC .................... 401/195; 178/19.01; 178/19.04; 178/19.05

(58) Field of Classification Search
USPC ............... 178/19.01, 19.04, 19.05; 401/195
See application file for complete search history.

(56) References Cited

U.S. PATENT DOCUMENTS

| | | | | |
|---|---|---|---|---|
| 5,736,687 | A * | 4/1998 | Sellers | 178/18.03 |
| 7,268,774 | B2 * | 9/2007 | Pittel et al. | 345/179 |
| 7,460,110 | B2 * | 12/2008 | Ung et al. | 345/173 |
| 2005/0122319 | A1 * | 6/2005 | Sakurai et al. | 345/179 |
| 2010/0021022 | A1 * | 1/2010 | Pittel et al. | 382/123 |

* cited by examiner

*Primary Examiner* — Gregory Huson
*Assistant Examiner* — Joshua Wiljanen
(74) *Attorney, Agent, or Firm* — Altis Law Group, Inc.

(57) ABSTRACT

A hand-writing input device includes a penholder, a writing head and an infrared light source. The penholder includes a writing end and an opposite top end. The writing head is arranged on the writing end. The writing head is capable of leaving color distinguishable traces on an object. The infrared light source is positioned on the writing end of the penholder adjacent to the writing head. The present invention also relates to a hand-writing input system using the hand-writing input device.

1 Claim, 3 Drawing Sheets

HAND-WRITING INPUT DEVICE AND HAND-WRITING INPUT SYSTEM

BACKGROUND

1. Technical Field

The present disclosure relates to a hand-writing input device and a hand-writing input system.

2. Description of Related Art

With the development of information and communication technology, computers, mobile phones, personal digital assistants and other electronic devices are now widely used. Information input, such as characters input, is a must have function for such electronic devices.

Information input modes include a keyboard input, a voice input, a handwriting input, and many others. A typical handwriting input device includes a panel and a stylus. A number of resistors or capacitors are installed in the written panel and are arranged in an array. When the stylus touches the written panel, resistances/capacitances of some resistors/capacitors are changed. Thus, a position of the stylus on the written panel is sensed according to the change of the resistances/capacitances of the resistors/capacitors. A continuous movement of the stylus on the written panel can be sensed by continuously sensing the changes of the resistances/capacitances. Therefore, movement paths of the stylus are recorded, thus a handwriting function is achieved.

However, in the above hand-writing input device, information can only be recorded and stored in a memory or storage. When the recorded/stored information needs to be converted into hard copy file, the information has to be printed from a printer. If the information in the memory or storage is deleted by accident, it is difficult to be retrieved.

Therefore, a device and system for hand-writing input are desirable to overcome the above-described shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
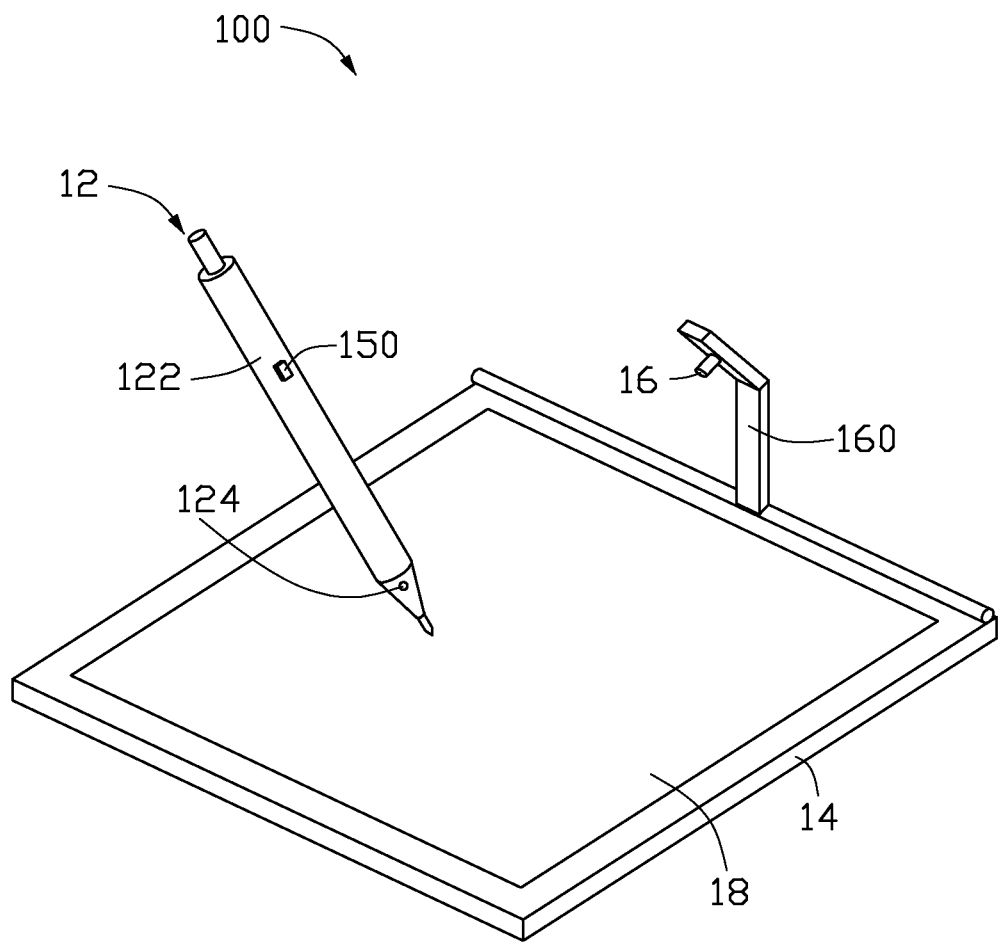
FIG. 1 is a schematic, isometric view of a first embodiment of a hand-writing input system, which includes a hand-writing input device.

Referring to FIG. 1, a hand-writing input system 100 according to a first exemplary embodiment includes a hand-writing input device 12, a written panel 14 and an image capture device 16.

Figure 2:
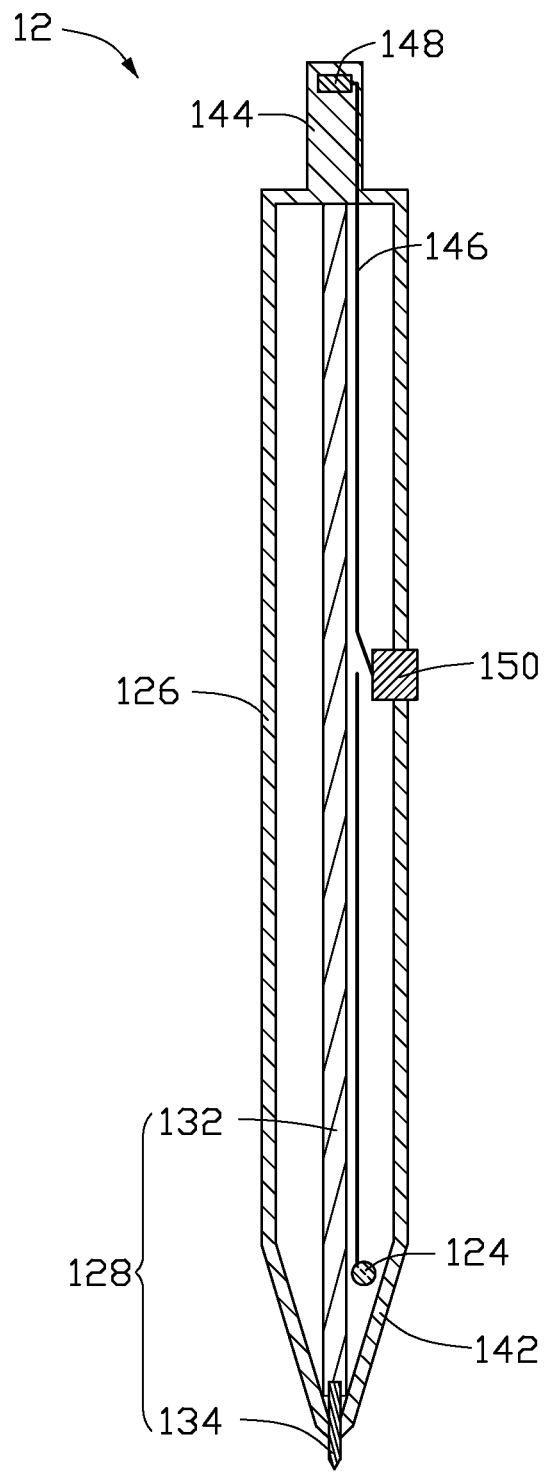
FIG. 2 is a sectional view of the hand-writing input device of the hand-writing input system in FIG. 1.

Referring also to FIG. 2, the hand-writing input device 12 includes a writing pen 122 and an infrared (IR) light source 124. The writing pen 122 is a writing tool capable of leaving solid or liquid color-distinguishable material, such as ink, on a handwriting traces recording object, such as a paper or a written panel. The writing pen 122 can be a ballpoint pen, a fountain pen, and many others. In this embodiment, the writing pen 122 is a ballpoint pen.

The writing pen 122 includes a penholder 126 and an exchangeable ink refill 128. The ink refill 128 includes an ink receiving tube 132 for receiving writing ink and a writing head 134 installed at one distal end of the ink receiving tube 132. The writing head 134 is hollow and in communication of the ink receiving tube 132. In use, the writing ink in the ink receiving tube 132 outflows from one distal end of the writing head 134 onto a paper or a written board.

In this embodiment, the penholder 126 is stick-shaped and includes a writing end 142 and an opposite top end 144. In particular, the penholder 126 has a hollow structure. The ink receiving tube 132 of the ink refill 128 is installed in the penholder 126. The writing head 134 of the ink refill 128 is exposed out of one distal end of the penholder 126 for writing.

The IR light source 124 is fixed adjacent to the writing end 142 of the penholder 126. In this embodiment, the IR light source 124 is exposed for emitting IR light to the image capture device 16. Upon conditions where the writing end 142 is made of a light-pervious material, the IR light source 124 can also be embedded in the writing end 142. The IR light source 124 can be an IR light emitting diode (LED).

The hand-writing input device 12 further includes a cell 148 installed in the top end 144 of the penholder 126, and a switch button 150. The cell 148 can be a button shaped cell. The IR light source 124 is electrically connected with the cell 148 via a lead group 146. The lead group 146 includes two leads (not shown). One end of the two leads is electrically connected with two electrodes of the IR light source 124 respectively, and the other end of the two leads is electrically connected with two electrodes of the cell 148 respectively. The cell 148 is configured for providing electric energy to the IR light source 124. It is to be understood that the cell 148 can also be installed at other positions of the penholder 126, for example between the writing end 142 and the top end 144.

The switch button 150 is set between the writing end 142 and the top end 144. The switch button 150 is installed in and extends out of the outer surface of the penholder 126. The IR light source 124 can be switched to an on or off state by pressing and releasing the switch button 150.

The written board 14 is a flat board for placement of a handwriting traces recording object. The handwriting traces recording object is configured for recording solid or liquid material outflowing from the writing head 134. In illustrated embodiment, the handwriting traces recording object is writing paper 18 as shown in FIG. 1.

The image capture device 16 is an IR sensing device for picking up IR light emitted from the IR light source 124. An installing stick 160 is fixed on one edge of the written board 14. In this embodiment, the installing stick 160 is perpendicular to the written board 14. The image capture device 16 is installed on the installing stick 160. A viewing field of the image capture device 16 covers the entire surface of the written board 14. The image capture device 16 can pick up images of light emitted from the IR light source 124 continuously with a certain frequency. Therefore, when the IR light source 124 is moved, the movement track of the IR light source 124 can be recorded. The information about movement track can then be transmitted to an output device with a display, such as a computer, a personal digital assistant and a mobile phone.

Referring to FIG. 1, a hand-writing process using the hand-writing input system is described in detail as follows.

Firstly, the switch button 150 is pressed to turn on the IR light source 124. The IR light source 124 is positioned facing towards the image capture device 16 so that the light emitted from the IR light source 124 can be picked up by the image capture device 16.

Secondly, a user holds the hand-writing input device 12 and moves the hand-writing input device 12 on the writing paper 18 such that the writing head 134 contacts the writing paper 18 to leave ink traces on the writing paper 18. Simultaneously, the movement track of the hand-writing input device 12 is picked up by the image capture device 16 and transmitted to an output device (not shown), such as a computer. Because the IR light source 124 is positioned close to the writing head 134, the movement track of the hand-writing input device 12 is generally identical to the ink traces shown on the writing paper 18.

The written board 14 of this embodiment can be omitted or replaced by other supports, as long as the ink traces can be left on the writing paper 18 by using the hand-writing input device 12.

In this embodiment, the ink traces can be left on the writing paper 18 and movements track can also be recorded. Therefore, both of paper files and electronic files about the movement of the hand-writing input device 12 can be recorded.

Figure 3:
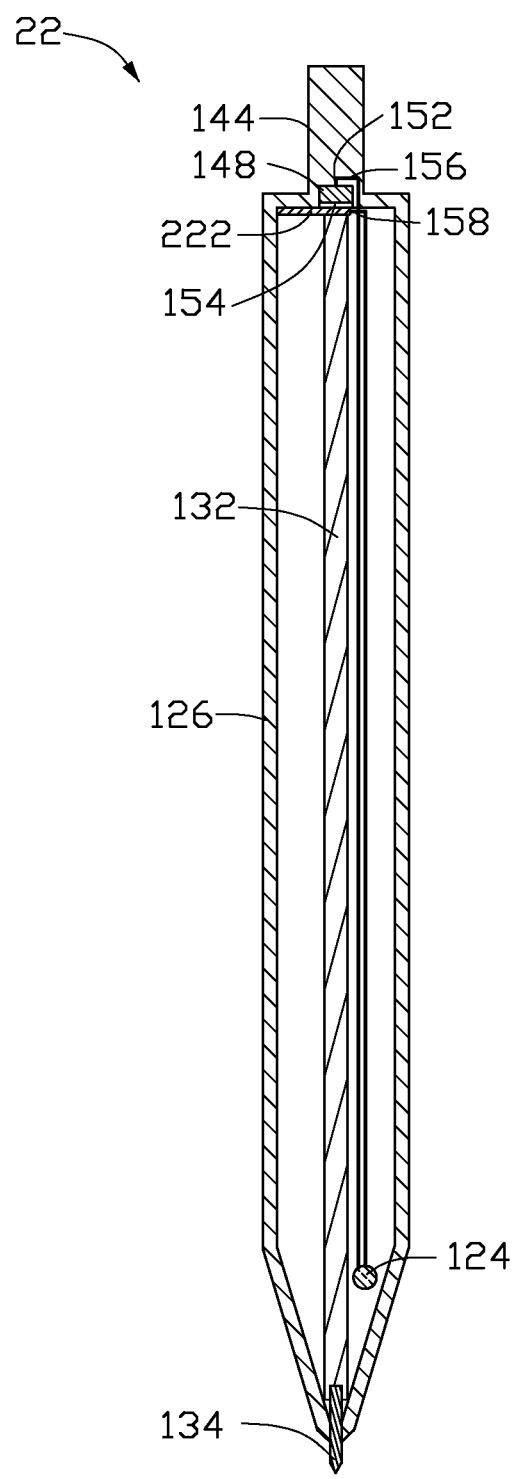
FIG. 3 is a schematic, sectional view of a second embodiment of a hand-writing input device.

Referring to FIG. 3, a hand-writing input device 22 in accordance with a second exemplary embodiment is provided, differing from the hand-writing input device 12 only in that switching the on or off state of IR light source 124 is realized by pressing the writing head 134. The distinguishing features in structure between the hand-writing input device 22 and the hand-writing input device 12 are described as follows. The hand-writing input device 22 further includes a spring member 222 fixed in the lens holder 124. The spring member 222 is positioned between the distal end of the ink receiving tube 132 and the cell 148. The spring member 222 contacts the distal end of the receiving tube 132 and is spaced from the cell 148. The cell 148 has an anode 152 and a cathode 154 at an opposite side of the anode 152. The cathode 154 is positioned facing towards the spring member 222. One end of two leads 156 and 158 is electrically connected with two electrodes of the IR light source 124 respectively. The other end of the lead 156 is electrically connected with the anode 152. The other end of the lead 158 is electrically connected with the spring member 222. The spring member 222 is an electrical conductor. A material of the spring member 222 can be selected from the group consisting of copper, iron, aluminum etc.

The use of the hand-writing input device 22 is described as follows, with replacement of the hand-writing input device 12 of FIG. 1 by the hand-writing 22. When the writing head 134 is pressed on the writing paper 18 for writing, the ink receiving tube 132 generates a pressure to the spring member 222 because of the pressing of the writing head 134. The spring member 222 bends and then contacts the cathode 154 of the cell 148 due to the pressure of the ink receiving tube 132. At this time, the IR light source 124 and the cell 148 form an electric loop, thus the IR light source 124 emits IR light. When the writing head 134 withdraws from the writing paper 18, the IR light source 124 switches to an off state. Therefore, when using the hand-writing input device 12 on the writing paper 18, the image capture device 16 can pick up the movement track of the hand-writing input device 12. When the writing head 134 is not in use to write on the writing paper 18, the movement track of the hand-writing input device 12 cannot be recorded. Thus the ink traces on the writing paper 18 can generally correspond to images of the movement track of IR light source 124.

It is to be understood that the above-described embodiment is intended to illustrate rather than limit the embodiments. Variations may be made to the embodiment without departing from the spirit of the invention as claimed. The above-described embodiments are intended to illustrate the scope of the invention and not restrict the scope of the embodiments.

What is claimed is:

1. A hand-writing input device, comprising:
    a penholder comprising a writing end and an opposite top end;
    a writing head arranged on the writing end, the writing head being capable of leaving color distinguishable traces on an object;
    an infrared light source positioned on the writing end adjacent to the writing head, the infrared light source comprising two electrodes;
    an ink-receiving tube in communication with the writing head, the ink-receiving tube being configured for receiving writing ink;
    a cell in the penholder, the cell being configured for providing electric energy to the infrared light source, the cell comprising an anode and a cathode at an opposite side of the anode;
    a push switch comprising a spring member, the spring member being spaced from the cathode in a natural state thereof; and
    two leads, one end of each lead electrically connected with a respective one of the two electrodes of the infrared light source, the other end of one of the leads electrically connected with the anode, the other end of the other lead electrically connected with the spring member;
    wherein when the writing head is pressed on a writing paper for writing, the ink receiving tube generates a pressure to the spring member because of the pressing of the writing head, the spring member bends and then contacts the cathode of the cell due to the pressure of the ink receiving tube, the infrared light source and the cell form an electric loop, the infrared light source emits infrared light; when the writing head withdraws from the writing paper, the infrared light source switches to an off state.

* * * * *